United States Patent [19]

Ferguson

[11] Patent Number: 5,024,174

[45] Date of Patent: Jun. 18, 1991

[54] AIRBAG STITCHING DEVICE

[75] Inventor: Vivian Ferguson, Richmond, Va.

[73] Assignee: Automated Machinery Systems, Inc., Richmond, Va.

[21] Appl. No.: 414,404

[22] Filed: Sep. 29, 1989

[51] Int. Cl.⁵ .................. D05B 3/00; D05B 27/10
[52] U.S. Cl. .................. 112/121.24; 112/14; 112/309
[58] Field of Search .................. 112/2, 10, 14, 121.12, 112/121.24, 121.28, 262.3, 308, 309, 311

[56] References Cited

U.S. PATENT DOCUMENTS

| 24,183 | 5/1859 | Tyler | 112/14 |
|---|---|---|---|
| 42,158 | 4/1864 | Blackham | 112/14 |
| 809,989 | 1/1906 | Shaw | 112/13 |
| 1,005,881 | 10/1911 | Ringe | 112/12 |
| 1,006,535 | 10/1911 | Comey | 112/12 |
| 1,243,089 | 10/1987 | Merrow | 112/121.24 |
| 1,534,818 | 4/1925 | Valentine | 112/121.24 |
| 1,864,452 | 6/1932 | Lutz | 112/121.24 |
| 1,864,453 | 6/1932 | Lutz | 112/121.24 |
| 2,063,521 | 12/1936 | O'Brien | 112/308 X |
| 2,105,097 | 1/1938 | Poole | 112/47 |
| 4,240,366 | 12/1980 | Smith | 112/121.24 |
| 4,253,413 | 3/1981 | Smith | 112/262.3 |

FOREIGN PATENT DOCUMENTS 1760994  8/1971  Fed. Rep. of Germany ........ 112/10

Primary Examiner—Werner H. Schroeder
Assistant Examiner—Paul C. Lewis
Attorney, Agent, or Firm—Staas & Halsey

[57] ABSTRACT

An airbag stitching device includes a sewing machine having a stitching head and a rotatable disc shaped support member adjacent to the stitching head. The rotatable disc shaped support member and a rotatable clamp are adapted to receive and hold a pair of superimposed circular sheets of fabric on a plane which is inclined with respect to the sewing plane and feed a peripheral portion of the superimposed fabric into the stitching head for sewing around the circumference of the circular sheets of fabric.

9 Claims, 2 Drawing Sheets

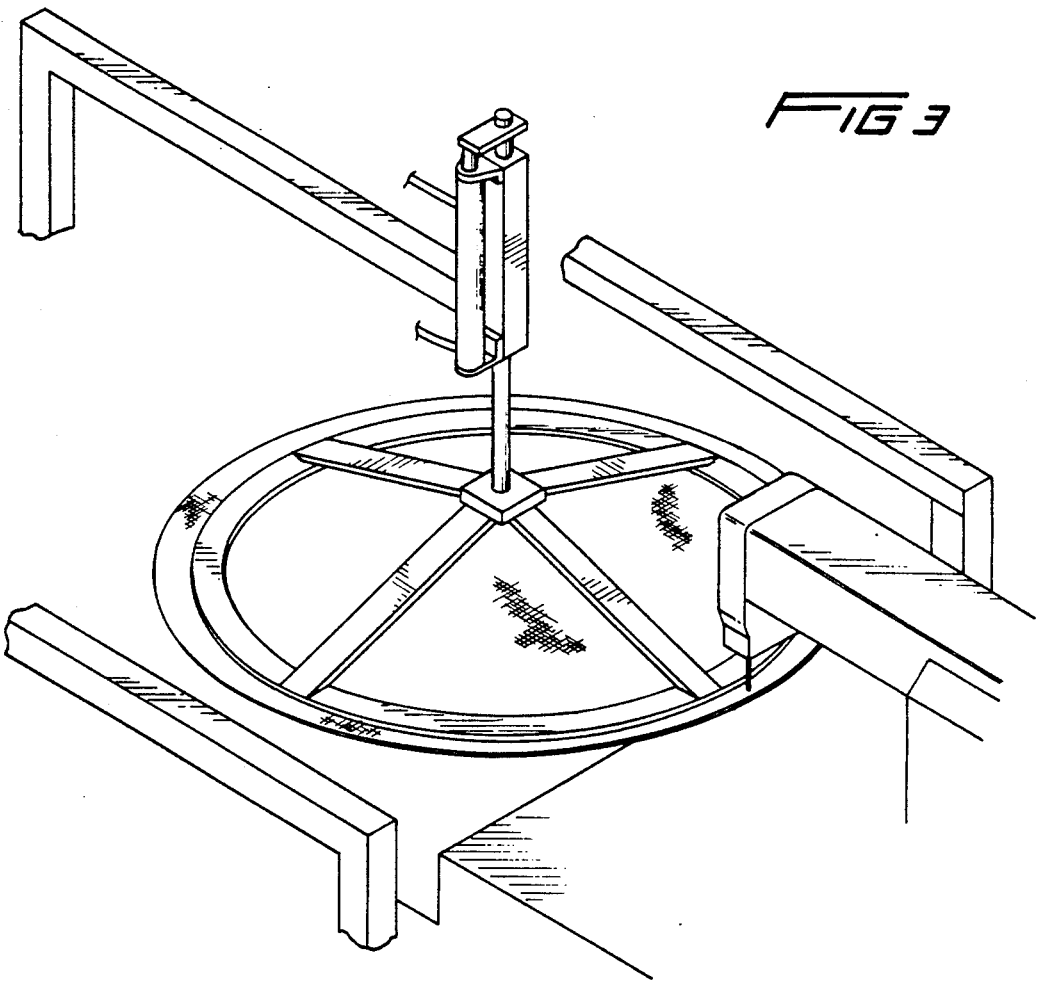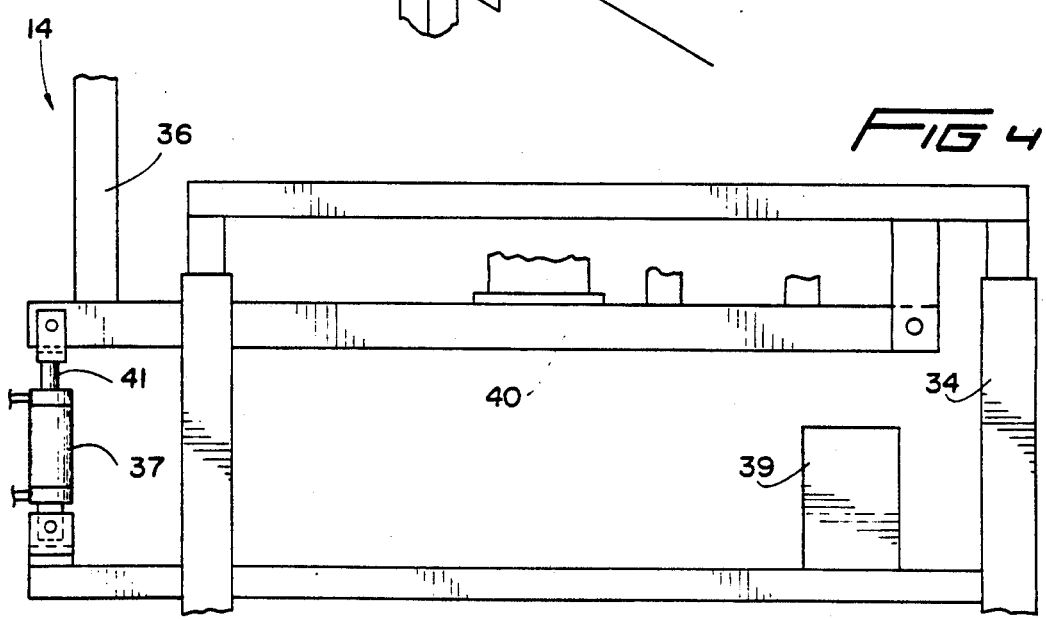

AIRBAG STITCHING DEVICE

BACKGROUND OF THE INVENTION

1. Field of the Invention

This invention relates to a stitching device or sewing apparatus for sewing along the perimeter of a circular or arcuate article and more particularly to an apparatus for sewing a pair of circular sheets together to form a restraint cushion or airbag.

2. Description of the Related Art

Feeding mechanisms for stitching or edging articles having a circular or arcuate configuration are known. For example, the U.S. Pat. Nos. of Lutz, 1,864,452 and 1,864,453, and of Smith, 4,240,366, disclose such mechanisms for sewing disc-shaped articles such as powder puffs, cushions or the like. Mechanisms of the type disclosed including feeding apparatus for positively directing the article to be stitched so that it turns about a fixed center and for holding the article in a manner which permits the article to be fed step by step about the center. For example, in the smith patent, a work station is adapted for receiving and maintaining a pair of superimposed sheets of fabric in position so as to allow the sheets to have the outer periphery thereof sewn together. The apparatus disclosed therein has a circular cover that cooperates with a similarly shaped rotatable table for clamping a pair of circular sheets of fabric in fixed relative positions with the peripheral portion of the sheets extending radially outwardly beyond the table so as to allow the sheets to be sewn together.

The device according to the prior art may be effective for sewing disc shaped articles at a relatively fast speed and to provide a relatively high degree of automation in sewing circular products as disclosed therein.

However, problems were encountered in attempting to sew large, circular layers of cloth or fabric for an airbag, i.e., the passive restraints that are now being installed in automobiles for protection of the passengers in the event of a collision. In stitching the large circular layers of cloth, problems of drag associated with the radially outwardly extending portions of cloth and difficulty in obtaining a smooth feed into a conventional stitching mechanism or sewing machine were encountered.

It should be understood that the demands of the commercial market require a relatively high degree of automation, a capability to sew products at a relatively high speed, with consistent and reproducible results and freedom from misfed or improperly stitched products. Accordingly, Applicant has invented an improved device which is applicable for stitching the circumference of airbags or the like.

SUMMARY OF THE INVENTION

In essence, an airbag stitching device according to the present invention comprises stitching means such as a conventional sewing machine head, provided with a reciprocating needle and looper or bobbin assembly, and a horizontally disposed rotatable support member adjacent to the stitching means. The rotatable support member is adapted to receive one or more pairs of superimposed circular layers of cloth there on with an edge of the cloth projecting radially beyond the edge of the support member. The rotatable support member is also adapted for rotation about an axis which is perpendicular to the support member. Positioning means are provided for rotating the support member about a second axis which is parallel to the support member and perpendicular to the reciprocating needle to thereby tilt the support member and layers of cloth with respect to the stitching means and with respect to the sewing plane. For example, the sewing head is relatively close to a first edge of the support member, i.e., slightly removed from a tangent to the circular support member and a second edge diametrically opposite to the first edge is elevated so that the support member is inclined at an angle of about 20°–40° with respect to the horizontal plane with its upper surface facing the reciprocating needle. In a preferred embodiment, the support member, clamping means and axis of rotation are all positioned on an inclined plane during the sewing operation and, upon rotation thereof, feeds the edges of the cloth layers into the stitching means or sewing head. Means are also provided for automatically stopping the sewing action and repositioning the support member to its horizontal position after stitching around the perimeter of the cloth layer is completed, i.e., after 360° rotation.

BRIEF DESCRIPTION OF THE DRAWINGS

FIG. 3 is a partial perspective view of the airbag stitching device according to the invention; and FIG. 4 is a schematic view of the mechanism for tilting a rotatable fabric support assembly according to the invention.

DETAILED DESCRIPTION OF THE INVENTION

Figure 1:
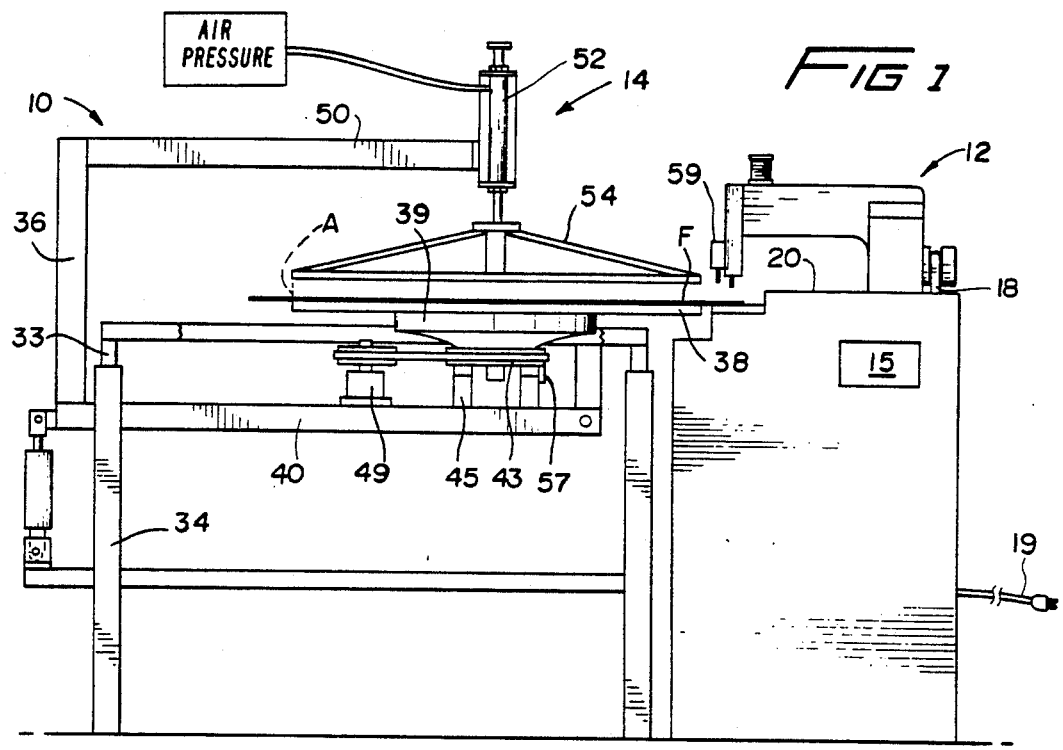
FIG. 1 is a somewhat schematic side elevational view partly broken away showing an airbag stitching device according to the present invention and is shown in its first operative or loading position.
Figure 2:
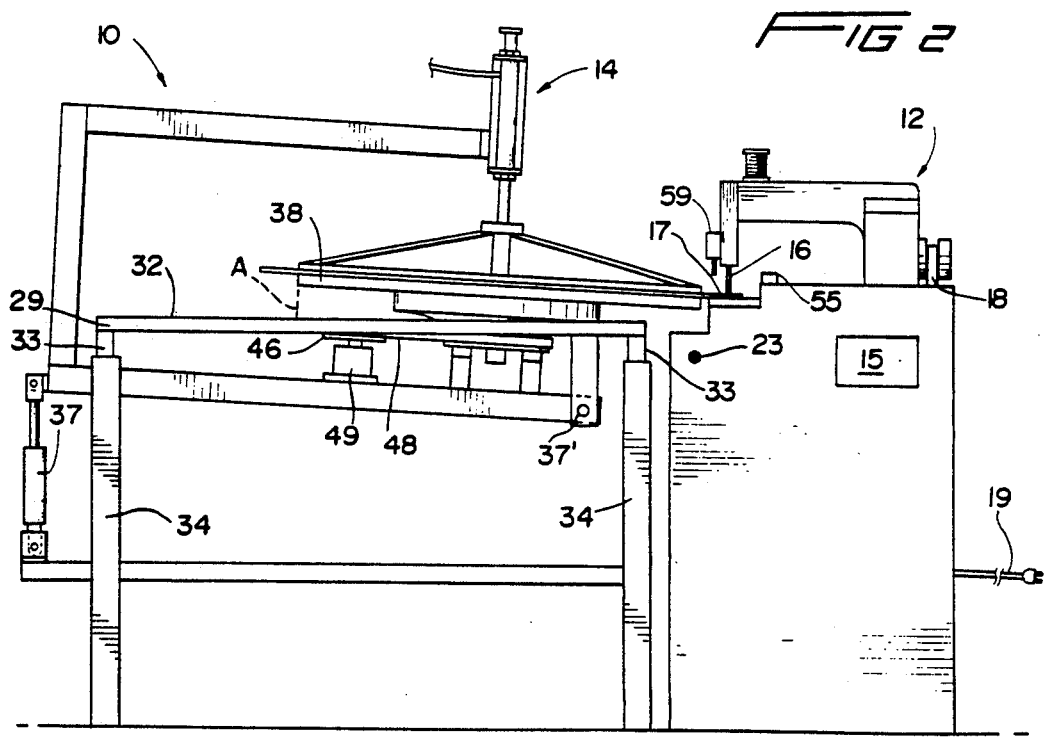
FIG. 2 is a somewhat schematic side elevational view of the airbag stitching device in FIG. 1 but in its second operative or stitching position.

Referring now to the drawings and more specifically to FIGS. 1–3, the airbag stitching device made in accordance with the present invention comprises a fabric support device 10 and a sewing machine 12. The fabric support device 10 includes a moVable assembly 14 and is constructed and arranged in connection with the sewing machine 12, as will be more fully described hereinafter, to sew the peripheral edge of a pair of superimposed circular sheets of fabric. One of these circular sheets also defines a circular opening at the center there of so that the sewn or stitched layers of fabric can be turned inside out after the stitching is completed.

The sewing machine 12 is provided with a reciprocating needle 16 which cooperates in a conventional way with a looper or bobbin not shown below the level of sewing, i.e.. below the work support 17 which is preferably disposed on horizontal plane. The sewing mechanism, i.e., the reciprocating needle 16 reciprocates along a vertical axis and may be driven by means of a belt 18, pulley 19 and actuating shaft, not shown. In essence, the sewing machine and/or sewing head are of conventional designs and different types and/or makes may be substituted in the apparatus without departing from the scope of the appended claims.

The sewing machine 12 is mounted on a table 20 and may be actuated by an on-off switch 21 for providing electrical power to a circuit and/or wiring, not shown, through a programmable logic controller 15 which controls the operation of the movable assembly 14, and sewing machine 12. In the preferred embodiment of the invention, the programmable logic controller is of conventional design, such as a Mitsubishi PLC and its operation in controlling the sequences of operations and the operation of the airbag stitching device, according to the present invention, will be well understood by those of ordinary skill in the art. The table 20 also has a switch 23 mounted thereon for directing electrical current from a source 19 to a motor not shown for operating the sewing machine 12. This motor drives the sewing machine needle 16 by means of a pulley 19 and actuating rod not shown for stitching the pair of superimposed layers of cloth. In the preferred embodiment of the invention, the sewing machine 12 is a model 1503 manufactured by Kansai Sewing Machine Co., Tokyo, Japan.

The fabric support device 10 includes a plurality of interconnected horizontal channel members 29 which define a horizontal plane 32 and are supported by four upstanding legs 34. The plane 32 is adjacent to the work support 17 of the sewing machine 12 and at about the same level. The level of the plane 32 may also be adjusted vertically by means of adjusting members 33 such as a threaded shaft in each of the upstanding legs 34 as will be well understood by those of ordinary skill in the art.

The movable assembly 14 includes a C-shaped member 36, a rotatable disc shaped support 38 and bearing means for mounting the rotatable disc shaped support 38 on a lower portion 40 of the C-shaped member 36. The disc shaped support 38 is mounted on a reinforcing plate 39 which has a shaft 41 protruding from the bottom thereof. This shaft 41 has a pulley 43 fixed thereto and is mounted in a bearing assembly 45 in a convention manner. The bearing assembly 45 is fixed to the lower portion 40 of the C-shaped member 36. A motor 49 is also mounted on the lower portion of the C-shaped member 36 and is adapted to rotate the plate 39 and disc-shaped support 38 by means of a pulley 46 and belt 48, when energized from a source of electricity 19, in response to a signal from the programmable logic controller 15.

An upper portion 50 of the C-shaped member 36 has a pneumatic cylinder 52 fixed to the end so that the pneumatic cylinder 52 is generally parallel with the vertical portion of the C-shaped member 36. The pneumatic cylinder 52 also carries a circular rotatable clamp 54 and is adapted to force the clamp 54 downwardly in response to a signal from the controller 15 against the disc shaped support 36 to clamp a pair of circularly shaped fabric layers in superimposed fixed relationship with respect to support 36 by means of pneumatic pressure. Thus, any rotation of pulley 46 rotate s the disc shape d support 38, clamp 54 and any fabric which is clamped on the support 36.

The movable assembly 14 including the C-shaped member 36, clamp 54 and disc shape d support 38 are pivotally mounted on the fabric support device 10 as illustrated more clearly in FIG. 4.

The moveable assembly 14 is tilted by means of an air piston 37 so that the disc shaped support 38 is rotated about an axis which is parallel to the normal line of stitching. For example, the normal line of stitching is the tangent to the circular workpiece at the point of stitching. In other words, the side of the assembly 14 which is farthest from the needle 16 is elevated by means of an air cylinder 37 and pivot assembly 37' in a manner so that the part of rotatable disc 38 which is closest to the needle 16 remains at about the same relative level with respect to the sewing plane so that the superimposed layers of fabric are disposed on a plane which is inclined with respect to the plane of stitching and with its top surface facing the sewing head or stitching means 12. As illustrated, the angle between the plane on which the fabric is disposed and an extension of the horizontal sewing plane is approximately 20°–40° and preferably about 30°. As a result, there is an obtuse angle formed by the fabric and its peripheral portion at the point of stitching of about 150°.

The operation of the airbag stitching device disclosed here in begins with the assembly 14 in a first operative or loading/unloading position, i.e., with the disc-shaped fabric support 38 disposed on a horizontal plane and essentially coplanar with the work support 17. In the first operative or loading/unloading position, the clamp 54 is in an open or elevated position and the piston in air cylinder 52 is fully retracted.

An operator places a pair of superimposed circular layers of fabric on the disc-shaped support 38 and centers them thereon so that the peripheral edge thereof extends under the needle 16. In other words, the edge of the pair of circular layers of fabric lie across the stitching axis.

With the layers of cloth carefully positioned on the disc-shaped support, the operator depresses the switch 23 which activates the air cylinder 52 by means of controller 15 so that the piston in cylinder 15 moves downwardly and presses clamp 54 against the fabric between the clamp 54 and disc support 38. When clamp 54 reaches the closed position, it sends a signal to controller 15 which activates air cylinder 37 to move shaft assembly 41 upwardly to tilt the rotatable assembly 14 upwardly about the pivotal assembly 37' so that the upper surface of disc support 38 is tilted to a predetermined angle of about 30°. At this point, controller 15 activates the motor 49 and rotates the disc shaped support 38 through 360° and preferably slightly beyond to provide about one inch of overlapping stitching.

The edge of the fabric is fed to and through stitching means 12 and the reciprocating needle 16 is activated by means of controller 15 to sew the edge of the fabric together during the rotation thereof. The degree of rotation, i.e., slightly beyond 360° can be controlled by a conventional stitch counter 55 or by a magnetic bar (not shown) and detector 57 on the underside of the rotating elements. In either case, the complete rotation, activation and stopping of the sewing machine 12 may be programmed into the controller 15 in a manner which is well understood in the art. Also, upon completion of the stitching controller 15 signals a thread cutter 59 to cut the thread between the needle 16 and the stitched fabric.

The controller 15 also signals the air cylinder 37 to return the assembly 14 to the load/unload position, and to raise the clamp 54 so that the stitched fabric may be removed by an operator and a second pair of superimposed circular layers of fabric may be positioned on the disc-shaped support 38 and the stitching operation repeated.

While the invention has been described in connection with a preferred embodiment, it should be understood that changes and modifications may be made therein without departing from the scope of the appended claims.

What is claimed is:

1. An airbag switching device comprising switching means for stitching along a sewing plane and a rotatable support member for rotation about an axis disposed on a horizontal plane adjacent to said stitching means and adapted to receive a pair of superimposed circular cloth layers having outer edges thereon, clamp means for holding the superimposed circular layers of cloth on said rotatable support member, and positioning means for tilting said support member, said clamp means and circular cloth layers on an incline with respect to the sewing plane, means for activating said stitching means and means for rotating said support member, clamping means and cloth in a tilted position to thereby feed a peripheral portion of the superimposed circular layers of cloth into the stitching means so that the outer edges of the cloth are sewn together, and means for terminating rotation of the support member and cloth and for deactivation of the stitching means after completing 360° of rotation.

2. An airbag stitching device according to claim 1 which includes means for returning said rotatable support member to a horizontal plane following rotation of at least 360°.

3. An airbag stitching device according to claim 2 in which the means for terminating the rotation of the support member and cloth and for deactivating the stitching means is activated by a stitch counter counting a predetermined number of stitches.

4. An airbag stitching device according to claim 3 in which said rotatable support member defines a circular base and in which said support member and said clamp means are constructed and arranged to hold the superimposed circular cloth layers with their centers on the axis of rotation and with the edges of the circular cloth layers projecting radially outward and beyond said support member so that the edges of the cloth are fed into the stitching means as the support member is rotated.

5. An airbag stitching device according to claim 4 which includes thread cutting means and means for activating said thread cutting means after stitching around at least 360° of the circular layers of cloth.

6. A method for stitching or sewing two superimposed circular workpieces along their circumference comprising the steps of:
(a) providing a stitching mechanism and a horizontally disposed rotatable support having an outer edge which is adapted to rotate about a perpendicular axis;
(b) placing a pair of superimposed circular layers of cloth having outer edges on the rotatable support and positioning the layers of cloth with their centers on the axis of rotation and with the edges of the cloth projecting radially beyond the edge of the support member;
(c) clamping the layers of cloth on the rotatable support;
(d) titling the rotatable support, clamp and superimposed layers of cloth with respect to the stitching mechanism so that the support and layers of cloth are inclined at an acute angle of about 30° with respect to an extension of horizontal stitching plane;
(e) rotating the rotatable support, clamp and layers of cloth about an axis which is perpendicular to the inclined plane of the rotatable support to thereby feed the edges of the superimposed layers of cloth into the stitching mechanism and stitching around the circumference of the layers of cloth;
(f) discontinuing rotation of the support member and stitching after rotating the circular layers of cloth through 360°; and
(g) returning the support, layers of cloth and clamp to a horizontal plane and releasing the clamp for removal of the layers of cloth from the support.

7. A method for stitching or sewing two superimposed circular workpieces along their circumference according to claim 6 wherein the circular layers of cloth are rotated and stitched beyond 360° to thereby provide a portion of overlapping stitches.

8. A method for stitching or sewing two superimposed circular workpieces along their circumference according to claim 7 wherein the sewing is discontinued prior to returning the support mechanism, layers of cloth and clamp to a horizontal position.

9. An airbag stitching device comprising stitching means for stitching along a sewing plane and a rotatable support member for rotation about an axis disposed on a horizontal plane adjacent to said stitching means and adapted to receive a pair of superimposed circular cloth layers having outer edges thereon, clamp means for holding the superimposed circular layers of cloth on said rotatable support member motor means for rotating said support member and thus the clamping means and cloth thereby feeding a peripheral portion of the superimposed circular layers of cloth into the stitching means so that the outer edges of the cloth are sewn together, and control means, operatively coupled to the motor means, stitching means and clamp means, for moving the clamp means into a clamping position, initiating rotation of the support member while activating the stitching means, and terminating rotation of the support member and cloth and for deactivation of the stitching means after completing at least 360° of rotation, and
a stitch counter coupled to the controller and counting a predetermined number of stitches corresponding to the at least 360° of rotation, whereby the controller deactivates the stitching means, motor means and clamp means after the stitch counter counts the predetermined number of stitches.

* * * * *